United States Patent [19]

Goergen

[11] Patent Number: 4,865,099

[45] Date of Patent: Sep. 12, 1989

[54] TIRE TREADS WITH VARIABLE DEPTH GROOVES

[75] Inventor: René Goergen, Colmar-Berg, Luxembourg

[73] Assignee: The Goodyear Tire & Rubber Company, Akron, Ohio

[21] Appl. No.: 245,972

[22] Filed: Sep. 19, 1988

Related U.S. Application Data

[63] Continuation of Ser. No. 838,418, Mar. 10, 1986, abandoned, which is a continuation of Ser. No. 584,191, Feb. 27, 1984, abandoned.

[51] Int. Cl.[4] .............................................. B60C 11/06
[52] U.S. Cl. ................................................ 152/209 R
[58] Field of Search ....................... 152/209 R, 209 D

[56] References Cited

U.S. PATENT DOCUMENTS

| 3,951,193 | 4/1976 | Yeager | 152/209 R |
| 4,423,760 | 1/1984 | Treves et al. | 152/209 R |
| 4,449,560 | 5/1984 | Tansei | 152/209 R |

FOREIGN PATENT DOCUMENTS

| 2030937 | 4/1980 | United Kingdom | 152/209 D |
| 2100200 | 12/1982 | United Kingdom | 152/209 R |

Primary Examiner—Michael W. Ball
Assistant Examiner—Geoffrey L. Knable
Attorney, Agent, or Firm—R. J. Slattery, III

[57] ABSTRACT

A tire has a tread with circumferentially extending ribs separated by a circumferentially extending zig-zag groove. The depth of the groove varies in the circumferential direction of the tire and is at a maximum at the vertex of each projecting angle of a rib, and at a minimum at the vertex of each reentrant angle of a rib.

5 Claims, 4 Drawing Sheets

TIRE TREADS WITH VARIABLE DEPTH GROOVES

This is a continuation of application Ser. No. 838,418 filed Mar. 10, 1986, now abandoned, which is a continuation of application Ser. No. 584,191 filed Feb. 27, 1984, now abandoned.

BACKGROUND OF THE INVENTION

This invention relates to tire treads and more particularly to tire treads having a plurality of zig-zag ribs separated by parallel zig-zag grooves with varying depths along their lengths.

Tires, especially truck tires with circumferential zig-zag ribs, have been observed to be susceptible to a type of uneven wear generally referred to as "river wear". This type of wear which can be observed on trucks running on highways, is characterized in that the protruding portions of the ribs wear faster than the recessed portions of the ribs. It is generally believed that this type of wear is caused by excess stresses localized at the protruding portions of the ribs. It is furthermore believed that by making the rib peaks more flexible as compared to the rib corners, the uneven wear can be reduced to a great extent. This invention provides the desired localized flexibility by varying the depth of the zig-zag grooves in the circumferential direction of the tire such that they are deepest at the vertices of the projecting angles of the ribs and shallowest at the vertices of the reentrant angles of the ribs.

There is provided in accordance with the invention a tire having a treat with a pair of circumferentially extending ribs separated by a circumferentially extending zig-zag groove, said zig-zag groove having a pair of walls, respectively associated with said pair of ribs, and a base, each wall connecting the base of the groove with the ground-engaging surface of the respective rib, each rib having a series of alternately projecting and reentrant angles with the vertices of said angles located at points where the respective groove walls make changes in direction with respect to the axis of rotation of said tire, characterized in that throughout the useful life of the tire the base of said groove comprises a surface which is disposed at a radially measured distance from the ground-engaging surfaces of the ribs which varies in the circumferential direction of the tire and which distance is at a maximum at the vertex of each of said projecting angles and at a minimum at the vertex of each of said reentrant angles.

BRIEF DESCRIPTION OF THE DRAWINGS

An understanding of additional aspects of the invention can be gained from a consideration of the following detailed description of representative embodiments thereof, in conjunction with the appended figures, wherein.

DESCRIPTION OF THE PREFERRED EMBODIMENTS

Figure 1:
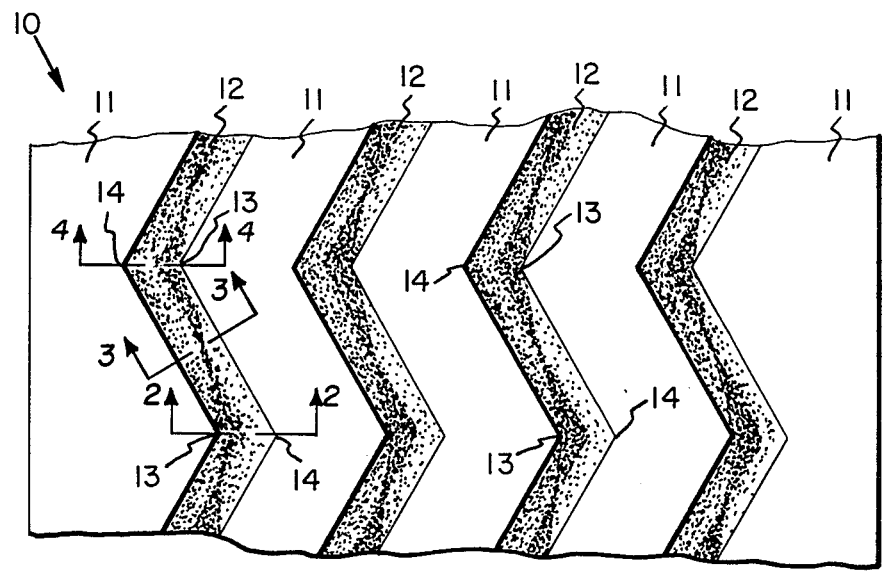
FIG. 1 is a fragmentary plan view of a tire tread embodying the invention.

FIG. 1 shows a portion of a tread 10 of a pneumatic tire which is generally used on medium and heavy trucks. The tread comprises a plurality of circumferentially extending ribs 11 which are separated by circumferentially extending zig-zag grooves 12. As used herein and the appended claims, "zig-zag" refers to an undulating or sinusoidal pattern as well as to the conventional pattern of a series of adjacent straight segments alternating in direction with respect to the axis of rotation of the tire.

Each rib 11 that has a ground-engaging surface with an axial edge defining a zig-zag groove 12 has a series of alternating projecting angles 13 and reentrant angles 14. In a newly molded tire the portion of the radially outer surface 18 of a rib located in the area included by a projecting angle will engage the ground when the tire is mounted upon a a wheel and inflated and subjected to its rated load. As used herein the vertex of an angle means a point where a respective groove wall makes a change in direction with respect to the axis of rotation of the tire. As may be seen in FIGS. 2, 3 and 4, a zig-zag groove in accordance with this embodiment of the invention has a pair of groove walls 15, 16 connecting the groove base 17 with a ground-engaging surface 18 of the rib or ribs 11 that define the groove.

As used herein, the distance from the surface of the groove base to the ground-engaging surface of the tread means the distance such as measured in the radial direction, i.e. perpendicular to the axis of rotation of the tire, from a particular point on the base or floor of the groove to the ground-engaging surface of the tread. This distance is referred to as the "depth" of the groove.

The radially measured distance from the surface of the groove base to the ground-engaging surface of the tread, may either vary continuously or step-wise; that is to say, the groove base may be either a continuously warped surface or a surface that is both stepped in the circumferential direction of the tire and tapered in the axial direction. It is preferable that the grooves have a greater width at the ground-engaging surfaces of the tread than at the groove base, and that the angle each groove wall 15, 16 forms with respect to a line perpendicular to the ground-engaging surface of the tread remains constant around the circumference of the tire.

It is believed that by having the projecting angles 13 of the ribs 11 more flexible than the reentrant angles 14 by locating the maximum depth of a groove at the vertices of the projecting angles, the concentration of the stresses at the projecting angles as they pass through the footprint of a rotating tire will at least be reduced. At the same time, the reentrant angles 14 of the ribs are made less flexible than the projecting angles by locating the minimum depth of the groove at the vertex of the reentrant angle. In other words, it is believed that a tire according to the invention will have ribs with projecting and reentrant angles that wear at rates which are closer to each other than those of prior art tires. It is an advantage that with the tire of the invention this relationship of greater groove depth at the vertices of the projecting angle than at the vertices of the reentrant angles will continue throughout the useful life of the tire. The "useful life" of a tire is considered to be over when the tire is worn so that wear indicators molded into the tread begin to engage the ground in normal use on a road.

Figure 2:
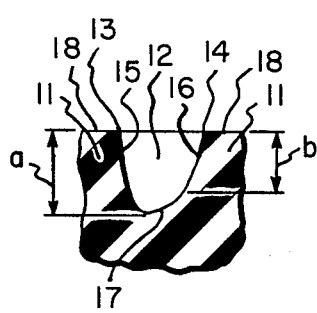
FIGS. 2, 3 and 4 are enlarged cross-sectional views taken along the lines 2—2, 3—3 and 4—4 respectively of FIG. 1.
Figure 3:
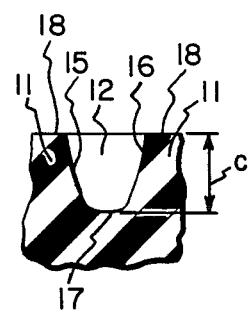
Figure 4:
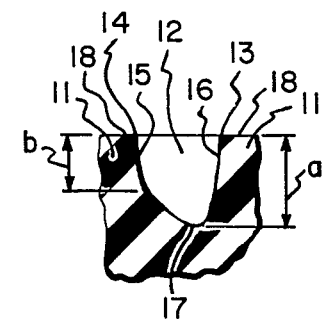

Referring to FIGS. 2, 3, and 4 which are cross sectional views along the lines 2—2, 3—3, and 4—4 respectively of FIG. 1 of a groove 12, on a larger scale than in FIG. 1, the continuously varying depth of the groove can be clearly seen. The embodiment of the invention wherein the depth of the groove varies stepwise is not illustrated in the drawing. FIG. 3 is a cross section of a groove 12 at a location midway between the ends of one leg of the zig-zag groove. The groove base 17 in FIG. 3 has a depth c that is preferably the nominal depth, or non-skid depth of the groove. FIG. 2 is a cross-section of the same groove located at the vertices of both a projecting angle 13 of a first rib and the associated re-entrant angle 14 of a second rib, with the two ribs defining the edges of the groove. The groove in FIG. 2 has a maximum depth a at the vertex of the projecting angle of the first rib and a minimum depth b at the vertex of the re-entrant angle of the second rib. In a newly molded heavy duty pneumatic tire the maximum depth a of the groove should be no more than about 5 millimeters greater than the nominal depth c of the groove and the minimum depth b of the groove should be no more than about 5 millimeters less than the nominal depth c of the groove. In other words, the maximum depth of the groove should be no more than 10 millimeters greater than its minimum depth, and preferably the maximum and minimum depths should not vary by more than 3.5 millimeters from the nominal depth. For example, if the nominal depth of the groove is 13 millimeters, then the depth of the groove at the vertex of each projecting angle should be no more than 18 millimeters, and the depth of the groove at the vertex of each re-entrant angle should be no less than 8 millimeters.

FIG. 4 is a cross-section of the same groove shown in FIGS. 2 and 3 taken along line 4—4 of FIG. 1 such that the rib that was presenting the vertex of a projecting angle in FIG. 2 is now presenting the vertex 14 of a reentrant angle and the rib that was presenting the vertex of a reentrant angle in FIG. 2 is now presenting the vertex 13 of a projecting angle. It is clear that in FIG. 4, the depth of the groove is once again a maximum at the vertex of the projecting angle and a minimum at the vertex of the re-entrant angle due to the continuously varying depth of the warped surface of the groove base 17.

Figure 5:
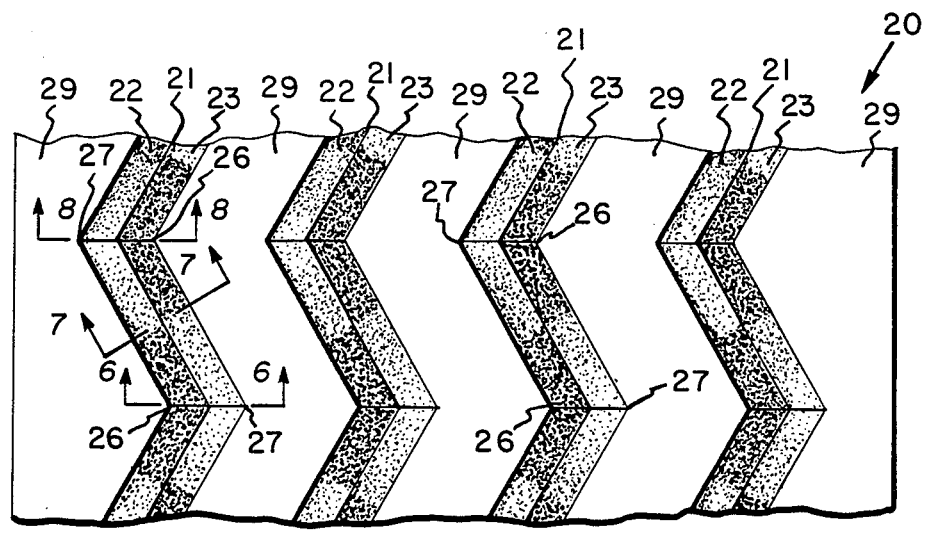
FIG. 5 is a fragmentary plan view of another tire tread embodying this invention.

Referring now to FIGS. 5, 6, 7, and 8, a second embodiment of the invention will be clearly pointed out. FIG. 5 shows a portion of a tread 20 of a tire that is similar to that illustrated in FIG. 1. While functioning along the same lines as the tread shown in FIG. 1, the grooves 21 have groove bases that comprise two surfaces 22, 23 with each of the surfaces being adjacent to one of the groove walls 24, 25 and being connected to one another by radially extending connecting surfaces 28. Each of the groove base surfaces 22, 23 has a varying depth which is at a maximum at the vertex of each of the respective projecting angles 26 of a rib 29, and at a minimum at the vertex of each of the respective reentrant angles 27 of a rib 29. As in the first embodiment, the depth of each surface of the groove base may vary either continuously or step-wise; that is to say, each of the groove base surfaces may be either continuously radially inclined and extending in the circumferential direction or radially stepped and extending in the circumferential direction. The stepped embodiment is not shown in the drawing.

Figures 6, 7, 8:
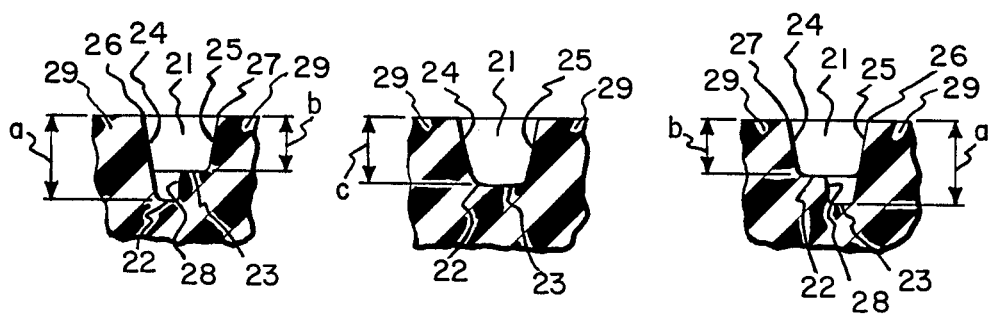
FIG. 6, 7 and 8 are enlarged cross-sectional views taken along the lines 6—6, 7—7 and 8—8 respectively of FIG. 5.

Referring to FIGS. 6, 7, and 8, which are radial cross-sectional views of a zig-zag groove 21 along the lines 6—6, 7—7, and 8—8, respectively, of FIG. 5, the varying depth of the groove according to this embodiment can be clearly pointed out. The other basic features of the grooves shown in and described with respect to FIGS. 1 through 4 also apply to this embodiment with the exception of the multi-surface groove base. In FIG. 7, it can be seen that midway, that is to say, intermediate along the length of one leg of the zig-zag groove, both of the groove base surfaces 22 and 23 are located at the same nominal uniform depth c. FIGS. 6 and 8 show that at the vertices of the respective projecting angles 26, each groove base surface has a maximum depth a, and that at the vertices of the respective re-entrant angles 27, each groove base surface has a minimum depth b. Again, it is preferred that the maximum depth of the groove should be no more than 10 millimeters greater than the minimum depth. It is preferred that the maximum and minimum depths do not vary by more than 3.5 millimeters from the nominal depth.

Figure 9:
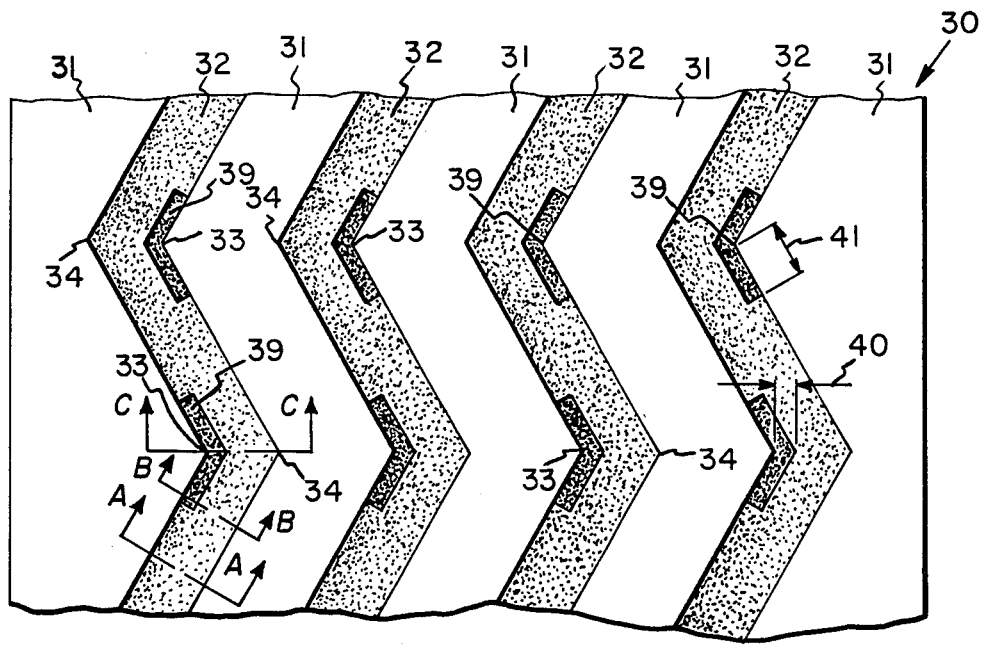
FIG. 9 is a fragmentary plan view of a further tire tread embodying this invention.

Referring now to FIGS. 9, 10, 11, 12, 13 and 14, two more embodiments of the invention will be described. FIG. 9 shows a portion of a tread 30 of a tire that is similar to that illustrated in FIGS. 1. and 5.

A tire having a tread made in accordance with either of these embodiment of the invention is characterized in that the groove base 37 is located at a first depth and a series of depressions 39 in the groove base that have a second depth that is greater than the first depth, with one of the depressions being located at the vertex of each of the projecting angles 33 of a rib 31 bordered by the zig-zag groove. It is preferable that the grooves have a greater axial width at the ground-engaging surfaces of the ribs than at the groove base, and that the angle that each groove wall 35, 36 forms with respect to a line perpendicular to the ground-engaging surface of the respective rib remains constant around the circumference of the tire.

Figure 10:
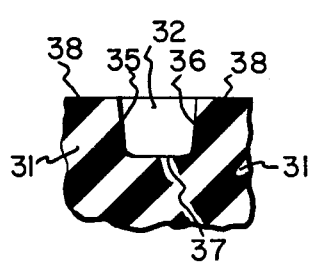
FIGS. 10, 11 and 12 are enlarged cross-sectional views taken along the lines A—A, B—B and C—C respectively of FIG. 9.
Figure 11:
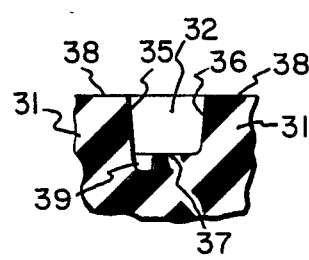
Figure 12:
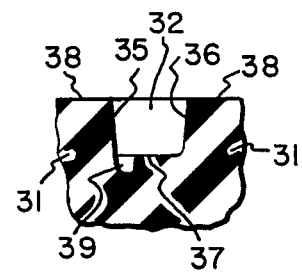

Referring now to FIGS. 10, 11 and 12, which are radial cross-sectional views of a groove 32 on a larger scale than in FIG. 9 along the lines A—A, B—B, and C—C, respectively, of FIG. 9, the relative depths of the groove base and the depressions can be clearly pointed out. FIG. 10 is a cross-section of a groove 32 at a location that does not intersect one of the depressions in the groove base and the groove base is located at a first depth that is constant across the axial width of the groove base. FIG. 11 is a cross-section of the same groove 32 at a location that does intersect one of the depressions in the groove base, but this location is not precisely at the vertex of a projecting angle of a rib, and it can be seen that the depression has a second depth that is greater that the first depth of the groove base. FIG. 12 is a cross-section of the same groove 32 at a location adjacent to the vertex of a projecting angle of an adjacent rib. It can be seen in FIG. 12 that the depression has the same depth as in FIG. 11, and that the projecting angle of the rib adjacent to the depression should be more flexible than the re-entrant angle of the other rib adjacent to the groove base because of the greater length of the groove wall at the depression. The depressions should have a maximum depth that is no more than 5 millimeters greater than the depth of the groove base, and most preferably no more than about 3.5 millimeters greater.

Referring once again to FIG. 9, it is preferred that the depressions have an axial width at the vertices of the projecting angles, as illustrated at 40, that is no more than one-half of the axial width of the groove base at the vertices of the projecting angles. Furthermore, as illustrated at 41 in FIG. 9, it is preferable that the depressions have a length, as measured along the adjacent groove wall, that is no more than one-half of the distance measured along said groove wall between the vertex of a projecting angle and the vertex of one of its next circumferentially adjacent re-entrant angles.

Figure 13:
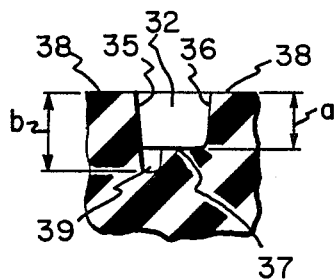
FIGS. 13 and 14 are enlarged cross-sectional views taken along the lines B—B and C—C respectively of FIG. 9, illustrating another embodiment of this invention.
Figure 14:
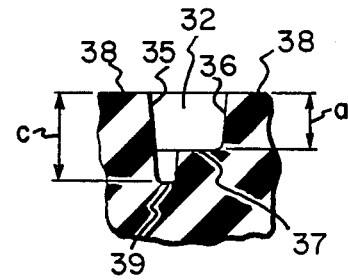

Referring now to FIGS. 13 and 14 another embodiment of the invention will be illustrated wherein the depressions have a depth that varies over the area of the depressions and is greatest adjacent to the vertex of a projecting angle of a rib. In this embodiment, the groove will have a cross-section like that shown in FIG. 10 unless it is in a location that intersects a depression. FIG. 13 is a cross-section of a groove taken along B—B of FIG. 9 that intersects a depression and is not adjacent to the vertex of a projecting angle. It is clear in FIG. 13 that the groove base 37 is located at a first depth a, and that the depression 28 has a second depth b that is greater than the depth a of the groove base. FIG. 14 is a cross-section of a groove taken along line C—C of FIG. 9 that intersects a depression 39 adjacent to the vertex of a projecting angle of a rib, and shows that the depression has a depth c that is even greater than depth b of the same depression in FIG. 13. It is still preferable in this embodiment that the maximum depth c of the depression should be no more than 5 millimeters greater than the nominal depth a of the groove, and most preferably no more than about 3.5 millimeters greater.

Figure 15:
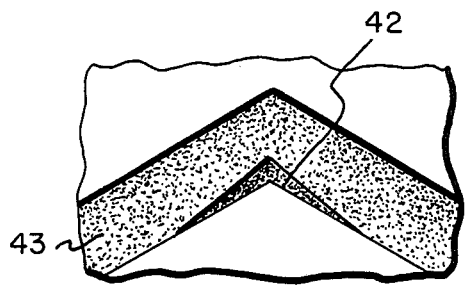
FIGS. 15, 16, 17 and 18 are enlarged plan views of portions of tire treads in accordance with further embodiments of the invention.
Figure 16:
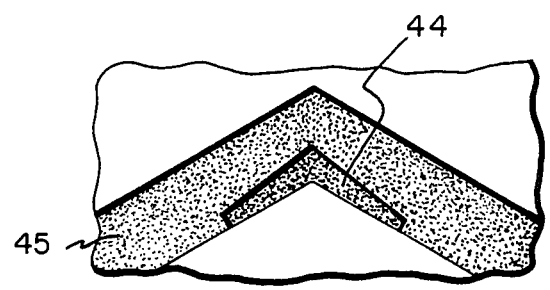
Figure 17:
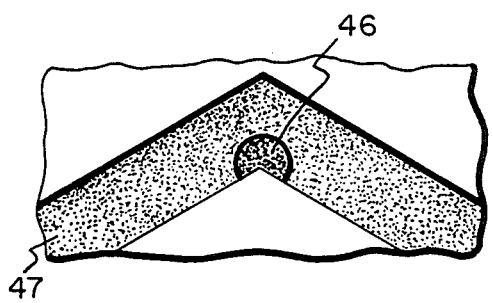
Figure 18:
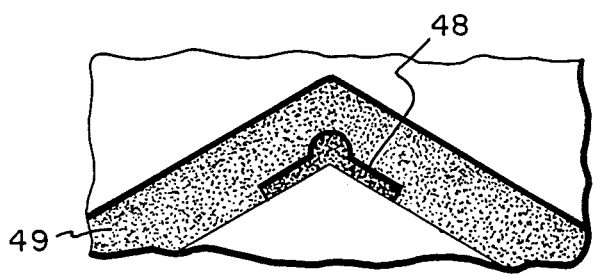

Referring now to FIGS. 15, 16, 17, and 18, there are shown plan views for portions of tire treads in accordance with other embodiments of the invention. The depressions 39 illustrated in FIG. 9 have a shape, as viewed looking radially inwardly towards the tread, with the sides of the depressions substantially parallel to the respective groove walls. In FIG. 15, the depression 42 in the groove 43 has legs that are each triangular as viewed looking radially inwardly towards the tread. In FIG. 16, the depression 44 in the groove 45 has legs that are quadrilateral as viewed looking radially inwardly towards the tread. In FIG. 17, the depression 46 in the groove 47 has a crescent-like shape as viewed looking radially inwardly towards the tread. In FIG. 18, the depression 48 in the groove 49 has a shape that is crescent-like, with legs extending along the groove wall. Obviously, the depression may have any shape consistent with the limitations set forth herein, without deviating from the spirit of the invention.

Many modifications of the preferred embodiments disclosed herein that are within the spirit and scope of the invention will readily occur to those skilled in the art upon a reading of the present specification. Accordingly, the invention is to be construed as including all of the embodiments thereof that fall within the scope of the appended claims.

What is claimed is:

1. A tire having a tread comprising a pair of circumferentially extending ribs separated by a circumferentially extending zigzag groove of a generally U or V-shaped cross section, said groove having a base and a pair of substantially straight walls respectively associated with the pair of ribs, each wall extending uninterrupted from the base of the groove to a ground-engaging surface of the respective rib, each rib having a series of alternately projecting and reentrant angles with the vertices of the angles located at points where the respective groove walls make changes in their direction with respect to the axis of rotation of the tire, wherein the base of said groove consists of a surface which is disposed at a depth defined by a radially measured distance from the ground-engaging surfaces of the ribs which varies in the circumferential direction of the tire and which said depth is at a maximum at the vertex of each of the projecting angles and at a minimum at the vertex of each of the reentrant angles of the ribs, such that the depth of the base of the groove varies axially across the groove from the vertex of the projecting angle to the vertex of the reentrant angle of the ribs while at a circumferentially intermediate portion between the vertices of the alternating projecting and reentrant angles, the base of the groove is uniform across the groove and at a depth in between said minimum and maximum depths.

2. A tire according to claim 1 wherein the depth of the base of the groove varies continuously in the circumferential direction of the tire.

3. A tire according to claim 1 wherein the depth of the base of the groove varies stepwise in the circumferential direction of the tire.

4. A tire according to claim 2 wherein the maximum depth is not more than 10 mm greater the minimum depth.

5. A tire according to claim 3 wherein the maximum depth is not more than 10 mm greater than the minimum depth.

* * * * *